(12) United States Patent
Briggs et al.

(10) Patent No.: US 10,195,901 B2
(45) Date of Patent: *Feb. 5, 2019

(54) SMARTWATCH BLACKBOX

(71) Applicant: International Business Machines Corporation, Armonk, NY (US)

(72) Inventors: Benjamin D. Briggs, Waterford, NY (US); Lawrence A. Clevenger, LaGrangeville, NY (US); Leigh Anne H. Clevenger, Rhinebeck, NY (US); Jonathan H. Connell, II, Cortlandt Manor, NY (US); Nalini K. Ratha, White Plains, NY (US); Michael Rizzolo, Albany, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,512

(22) Filed: Aug. 21, 2017

(65) Prior Publication Data

US 2018/0056862 A1 Mar. 1, 2018

Related U.S. Application Data

(63) Continuation of application No. 15/005,675, filed on Jan. 25, 2016, now Pat. No. 9,758,095.

(51) Int. Cl.
*B60Q 9/00* (2006.01)
*B60C 9/00* (2006.01)
(Continued)

(52) U.S. Cl.
CPC ............. *B60C 9/00* (2013.01); *B60Q 9/00* (2013.01); *B60W 30/08* (2013.01); *B60W 40/09* (2013.01); *B60W 2540/22* (2013.01)

(58) Field of Classification Search
CPC ...... B60Q 9/00; B60W 30/08; B60W 2540/00
(Continued)

(56) References Cited

U.S. PATENT DOCUMENTS 6,064,970 A    5/2000  McMillan et al.
6,886,653 B1 * 5/2005  Bellehumeur ....... B60K 28/063
                                              180/272

(Continued)

OTHER PUBLICATIONS

S. Lee, "Design Document for Development of Mining Minds Core Technology Exploiting Personal Big Data," (Project No. 10049079), Kyung Hee University, Apr. 24, 2015, 94 pages.

(Continued)

*Primary Examiner* — Phung Nguyen
(74) *Attorney, Agent, or Firm* — Vazken Alexanian; Michael J. Chang, LLC

(57) ABSTRACT

Techniques are provided for alerting drivers of hazardous driving conditions using the sensing capabilities of wearable mobile technology. In one aspect, a method for alerting drivers of hazardous driving conditions includes the steps of: collecting real-time data from a driver of a vehicle, wherein the data is collected via a mobile device worn by the driver; determining whether the real-time data indicates that a hazardous driving condition exists; providing feedback to the driver if the real-time data indicates that a hazardous driving condition exists, and continuing to collect data from the driver in real-time if the real-time data indicates that a hazardous driving condition does not exist. The real-time data may also be collected and used to learn characteristics of the driver. These characteristics can be compared with the data being collected to help determine, in real-time, whether the driving behavior is normal and whether a hazardous driving condition exists.

20 Claims, 6 Drawing Sheets

(51) Int. Cl.
B60W 40/09 (2012.01)
B60W 30/08 (2012.01)

(58) Field of Classification Search
USPC .............................. 340/439, 575, 576; 455/4
See application file for complete search history.

(56) References Cited

U.S. PATENT DOCUMENTS

| | | | |
|---|---|---|---|
| 8,090,598 B2 | 1/2012 | Bauer et al. | |
| 8,140,358 B1 | 3/2012 | Ling et al. | |
| 8,630,768 B2 | 1/2014 | McClellan et al. | |
| 9,028,405 B2 | 5/2015 | Tran | |
| 9,053,516 B2* | 6/2015 | Stempora | G06Q 40/08 |
| 9,630,555 B1* | 4/2017 | Prakah-Asante | B60Q 9/00 |
| 2011/0012720 A1 | 1/2011 | Hirschfeld | |
| 2011/0077028 A1* | 3/2011 | Wilkes, III | B60W 50/14 |
| | | | 455/456.3 |
| 2012/0197669 A1* | 8/2012 | Kote | G06Q 10/10 |
| | | | 705/4 |
| 2014/0081179 A1* | 3/2014 | Moore-Ede | A61B 5/1118 |
| | | | 600/595 |
| 2014/0197669 A1* | 7/2014 | Daghistani | A47C 1/032 |
| | | | 297/322 |
| 2015/0035643 A1 | 2/2015 | Kursun | |
| 2015/0127215 A1 | 5/2015 | Chatterjee | |
| 2015/0160019 A1 | 6/2015 | Biswal et al. | |
| 2015/0207840 A1 | 7/2015 | Lee | |
| 2016/0039424 A1* | 2/2016 | Hong | B60W 40/08 |
| | | | 701/2 |
| 2016/0052391 A1* | 2/2016 | Walsh | B60K 28/066 |
| | | | 340/575 |
| 2016/0264045 A1* | 9/2016 | Ng-Thow-Hing | B60Q 9/00 |

OTHER PUBLICATIONS

J. Bartlett, "Nissan Nismo smart watch puts car performance data on your wrist," ConsumerReports.org, Published: Sep. 9, 2013, Downloaded Jul. 21, 2015 from www.consumerreports.org/cro/news/2013/09/nissan-nismo-smart-watch-puts-car-performance-data-on-your-wrist/index.htm#.

M.V. Villarejo et al., "A stress sensor based on Galvanic Skin Response (GSR) controlled by ZigBee," Sensors, vol. 12, No. 5, May 2012, pp. 6075-6101.

List of IBM Patents or Applications Treated as Related (dated Aug. 21, 2017) (2 pages).

* cited by examiner

*FIG.* 6
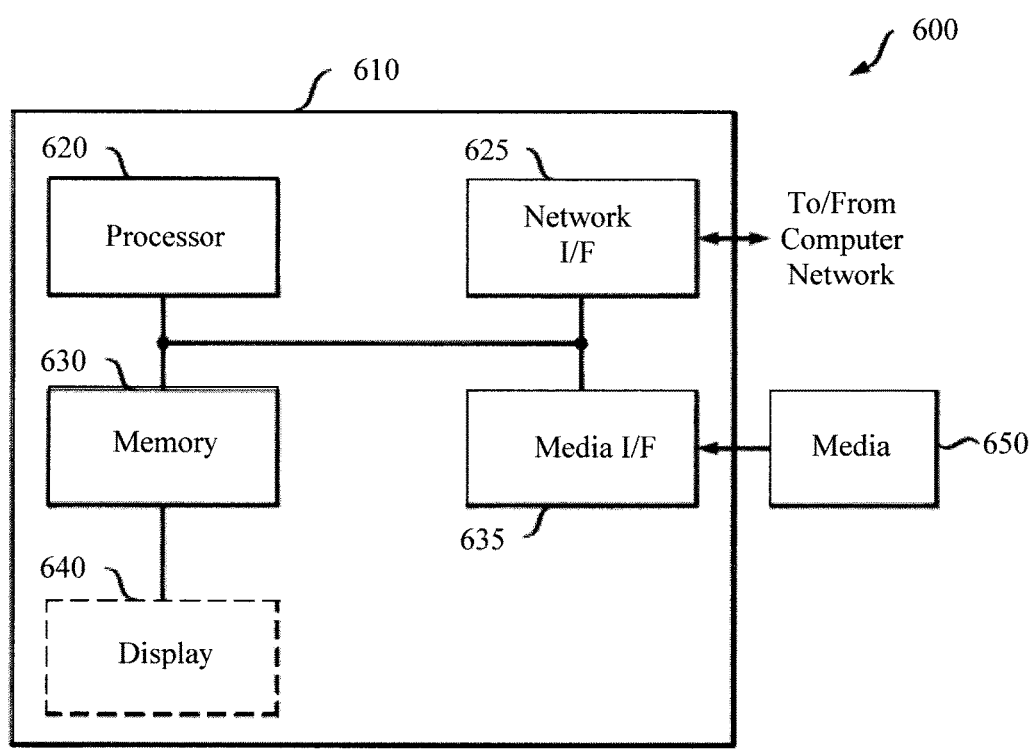

SMARTWATCH BLACKBOX

CROSS-REFERENCE TO RELATED APPLICATION(S)

This application is a continuation of U.S. application Ser. No. 15/005,675 filed on Jan. 25, 2016, now U.S. Pat. No. 9,758,095, the disclosure of which is incorporated by reference herein.

FIELD OF THE INVENTION

The present invention relates to safe driving practices, and more particularly, to techniques for alerting drivers of hazardous driving conditions using the sensing capabilities of wearable mobile technology, such as a smartwatch, to provide real-time feedback to drivers based on data collected via the smartwatch.

BACKGROUND OF THE INVENTION

People want to avoid automobile accidents, including those caused by their own behavior and emotions which can adversely affect their driving success. Insurance companies would like to get a better risk profile of operators.

Current technology for tracking driving performance is generally based on data collected from a vehicle. See, for example, U.S. Pat. No. 8,090,598 issued to Bauer et al., entitled "Monitoring System for Determining and Communicating a Cost of Insurance," wherein driving data is collected via a vehicle's on board data (OBD) collector. This technology is, however, tied to the vehicle itself rather than to the driver. Thus, data collected relates only generally to whoever is driving the vehicle.

Further, since information is collected via the vehicle itself, the data relates only to movement and operation of the vehicle. While it is assumed that the operation of the vehicle is a direct result of actions by the driver, there are many factors related to driving safety that cannot be accounted for. For instance, distractions, stress, etc. may impact a driver in a manner not detectable by the vehicle-based system. It would be desirable to be able to detect these situations and warn drivers of any potential hazards.

Therefore, techniques for monitoring drivers themselves and for warning the drivers when potentially hazardous situations arise would be desirable.

SUMMARY OF THE INVENTION

The present invention provides techniques for alerting drivers of hazardous driving conditions using the sensing capabilities of wearable mobile technology, such as a smartwatch, to provide real-time feedback to drivers based on data collected via the smartwatch. In one aspect of the invention, a method for alerting drivers of hazardous driving conditions is provided. The method includes the steps of: collecting real-time data from a driver of a vehicle, wherein the data is collected via a mobile device worn by the driver; determining whether the real-time data indicates that a hazardous driving condition exists; providing feedback to the driver if the real-time data indicates that a hazardous driving condition exists; and continuing to collect data from the driver in real-time if the real-time data indicates that a hazardous driving does not exist. The real-time data may also be collected and used to learn characteristics of the driver. These characteristics can be compared with the data being collected to help determine, in real-time, whether the driving behavior is normal and whether a hazardous driving condition exists.

A more complete understanding of the present invention, as well as further features and advantages of the present invention, will be obtained by reference to the following detailed description and drawings.

BRIEF DESCRIPTION OF THE DRAWINGS

FIG. 6 is a diagram illustrating an exemplary apparatus for performing one or more of the methodologies presented herein according to an embodiment of the present invention.

DETAILED DESCRIPTION OF PREFERRED EMBODIMENTS

Figure 1:
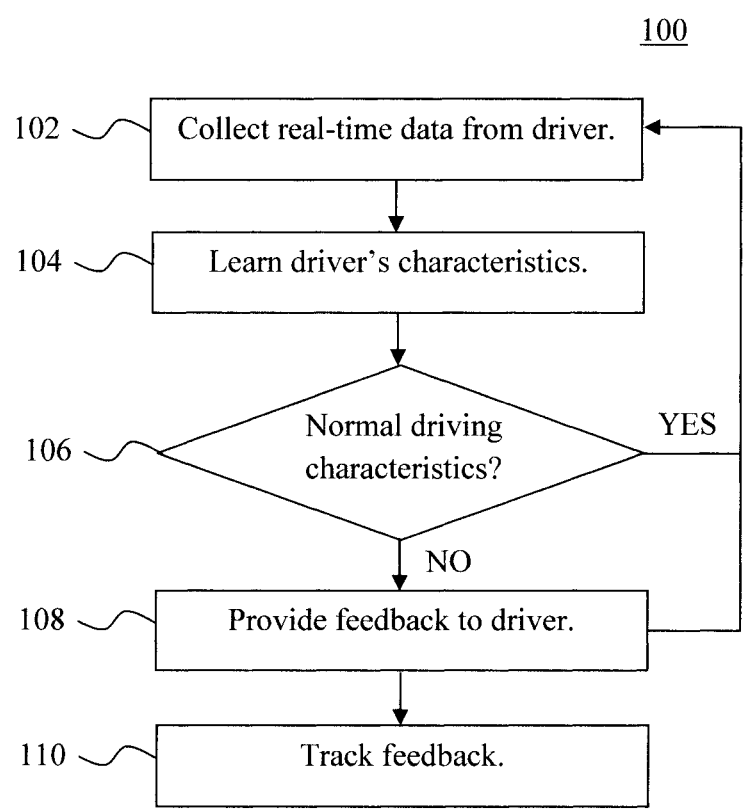
FIG. 1 is a diagram illustrating an exemplary methodology for alerting drivers of potentially hazardous driving conditions according to an embodiment of the present invention.

As provided above, there is a need for driver-based technology to monitor and warn drivers of potentially hazardous situations. This technology would collect data from the driver him/herself, rather than from the vehicle he/she is driving. This would provide a wealth of information not available from a vehicle-tied system. For instance, as will be described in detail below, there are indicators of stress, fatigue, impairment, etc. that can be gleaned from data collected from a driver, that might not be apparent at the vehicle operation level.

Advantageously, the present techniques leverage the capabilities of emerging smartwatch technology to capture data from a driver and implement safe driving practices. As will be described in detail below, smartwatches include a variety of sensors capable of collecting a vast amount of data from the user. Further, since the smartwatch is a wearable technology, users will often be wearing the smartwatch on a daily basis, such as when driving. By comparison, a smartphone, for example, is often carried as an accessory and is often not on the user's person when he/she is driving. Also, a smartwatch is typically worn on the user's wrist. Thus, useful data related to the user's arm movements can be collected via the smartwatch while the user is driving.

According to an exemplary embodiment, the present smartwatch-based techniques are used to collect (in real-time) driving data from a user and provide real-time warnings to the user of potentially hazardous situations. For instance, erratic side-to-side arm movements, high driving speeds (e.g., detected via the smartwatch global positioning system (GPS)—see below), etc. can be indicators of aggressive driving, and the present techniques may be used to alert the driver (e.g., via the driver's smartwatch and/or other available communication technology) to "slow down," "relax," etc.

As provided above, insurance companies might also have an interest in monitoring driver performance. Thus according to an exemplary embodiment, the smartwatch used in accordance with the present techniques can be provided by the insurance company to its insured drivers. For example, the insurance company might provide the smartwatch to its customers at a low-cost or even free, with the incentive for its use being a lower insurance rate for safer drivers. The insurance company can collect data from the driver when he/she is driving. The smartwatch in this case may be a "blackbox" to the user, in that the user might not care what software is present on the (insurance company-supplied) smartwatch and/or what specific driving data is being collected as long as they are rewarded with a lower insurance rate for safer driving and/or are alerted (as described above) when hazardous conditions arise.

While the example of a smartwatch is used in the instant description, the present techniques are broadly applicable to any wearable technology (e.g., smartwatch, smartglasses, etc.) capable of directly acquiring real-time data from a user, and thus may be referred to generally herein as a wearable mobile device. Smartwatches which may be used in accordance with the present techniques are available from companies such as Motorola™ (e.g., the MOTO 360), Samsung™ (e.g., Samsung Gear™), Apple™ (e.g., the Apple Watch™), etc.

A non-exhaustive list of smartwatch capabilities that may be leveraged in accordance with the present techniques is now provided. Different smartwatches (or other suitable wearable technology) have different capabilities, such as a variety of different sensors, user interactive features such as voice commands, audible/motion alarms/alerts, etc. By way of example only, some of the smartwatch technology that may be leveraged for the present techniques includes the following:

Sensors—the present techniques envision use of one or more sensors proximate to the user (also referred to herein as proximal sensors). These are sensors that can measure physical/physiological conditions of the user. These types of sensors generally require contact with the user to function, and thus are also referred to herein as contact sensors. For instance, one such contact sensor is an electrodermal activity or EDA sensor. EDA sensors measure the electrical characteristics of the skin. The electrical characteristics of the skin are controlled, at least in part, by the state of sweat glands in the skin, which in turn are regulated by the sympathetic nervous system. Thus, EDA sensors can gauge sympathetic and nervous responses.

More specifically, based on a sweat gland circuit-loop, EDA measures strength of change in skin conductance to electrical charge as reflecting sympathetic nervous system response to sensation. This change is associated with eccrine sweat-gland activity innervated by the sympathetic branch of the autonomic nervous system. Reactions cannot be controlled instantly with the mind, thus measurements reliably record stress caused by external stimuli.

EDA data is classified as either tonic—low amplitude, low frequency waveforms typical in a relaxed state—or phasic—higher amplitude, higher frequency waveforms occurring 1 to 3 seconds after a sensory stimulus. This phasic measurement is the skin conductance response (SCR). Sensory stimulus can be auditory, visual, olfactory, tactile, or vestibular (vertigo, imbalance).

In the context of the present techniques, EDA sensors can be used to collect real-time data indicating a level of stress of the driver, e.g., the driver is in a relaxed or high-anxiety/stress state. For instance, based on the above-described sensory stimulus, the driver might be under stress when he/she is driving aggressively, is in an accident, witnesses an accident or other hazardous road condition (e.g., other motorists around them driving improperly or speeding, slick road conditions, debris on the road, etc.)—based on the above-described sensory stimulus.

Other contact sensors useful for the present techniques include pulse oximeters and heart rate sensors. A pulse oximeter measures a person's blood oxygen levels often via a sensor placed on a part of the body such as a fingertip. Similarly, a heart rate sensor measures a person's heart rate or pulse (generally in beats per minute), e.g., via a sensor placed on the chest or wrist.

With regard to the present techniques, the driver's pulse/heart rate may be indicators of stress. As described above, driver stress may be caused by their driving condition and/or that of others, road conditions and hazards, etc. These vitals are also indicators of impairment conditions, such as when the driver is experiencing a medical condition like a heart condition. It is assumed that under normal driving conditions, a user will have a constant pulse/heart rate. Thus, drastic changes (spike or dip) in driver pulse/heart rate can be indicators of hazardous driving conditions.

Other useful proximal sensors are trajectory and pose sensors. For instance, an accelerometer can be used to detect the user's movement, speed and direction. A gyroscope sensor (often used in conjunction with an accelerometer) detects direction or orientation. A rate gyroscope similarly measures the rate of change of angle with time. A global positioning system or GPS provides location information.

An accelerometer can provide useful data driving performance. For example, abrupt accelerations and/or abrupt decelerations can indicate that the driver is speeding up very quickly and/or that the driver is slamming on the brakes. Both of these situations can be indicators of a hazardous condition. For instance, a driver that repeatedly slams on the brakes (detected via rapid deceleration) might be following too close to the driver in front of them and/or may be travelling at too high a rate of speed for the driving conditions (such as speeding in stop and go traffic).

With regard to the user's movements (detected, e.g., via the gyroscope/accelerometer), as provided above, data related to the user's arm motion while driving can be useful. For instance, rapid side-to-side arm motions might indicate weaving and/or other types of aggressive driving that might indicate a hazardous situation. For example, a driver that is weaving in and out of traffic is more likely to be involved in (or cause) an accident. Thus, when this type of driving behavior is detected, the driver might be prompted with an audible alert message (on his/her smartwatch and/or via other non-distracting means (such an audio warning through the vehicle's radio) to "slow down" or "maintain safe driving practices." Uncharacteristic arm movements might also indicate that the driver is doing something other than focusing on driving. For instance, the driver might be talking to a passenger and gesturing with his/her arm rather than gripping the steering wheel, the driver might be reaching for items in the vehicle, etc. All of these activities can lead to unsafe driving conditions.

A gyroscope sensor can provide data useful for detecting unusual driving occurrences. For instance, a sudden veering to the left or right might indicate that the driver has accidentally moved out of his/her lane or off of the road, is making drastic lane changes, is experiencing slick road conditions, etc.

GPS sensors provide a convenient way to determine the speed at which the driver (and thus the vehicle) is travelling. Speedometer capabilities are present in many current GPS modules. Thus, if the present system detects that the driver is speeding (e.g., based on current location and posted speed limits, size/type of road, weather/environmental conditions, etc. for that location), then an alert may be provided to the user in the above-described manner to, e.g., "slow down."

Yet another type of sensor that is useful for the present techniques is an environmental sensor. For instance, a compass and/or a magnetometer (which measures the direction of magnetic fields) can be used to determine the physical position of the user. A barometer, air temperature sensors, wind speed sensors, humidity sensors, etc. can be used to assess environmental conditions such as air pressure, temperature, wind velocity etc.

For instance, environmental sensors can be used to assess the weather conditions which can directly impact the driving conditions. Low temperatures in combination with high humidity can be indicators of (ice, snow, etc.) slick road conditions. While the sensors on the user's wearable mobile device might be measuring the environment within the vehicle, it is possible to tie into the vehicle's sensor system, which oftentimes includes a sensor for temperatures outside of the vehicle.

Useful data can also be collected via the wearable mobile device's microphone. The noise level in the vehicle can be an indicator of distractions to the driver. For instance, if passengers in the vehicle are talking loudly, children are screaming, the radio is at a high volume, etc. these all may serve as distractions to a driver. By way of example only, noise levels above a predetermined threshold (e.g., set at normal conversation levels) might be deemed a distraction.

An overview of the present techniques is now provided by way of reference to methodology 100 of FIG. 1. In step 102, real-time data is gathered from the driver and/or from the driver's surroundings. According to an exemplary embodiment, the real-time data is collected from the driver via the driver's smartwatch. Examples of data that may be collected using a smartwatch in accordance with the present techniques were provided above.

Standard data fusion techniques may be employed to analyze the data collected from different sensors together. For instance, a driver's (e.g., side-to-side) hand movements (detected via accelerometer) in combination with speed (detected via GPS) may be used to determine whether the driver is weaving, a combination of vibrations (detected via accelerometer) and audio (detected via the microphone) may be used to determine distracted driving (such as when the driver is distracted by music within the vehicle and veers off the road onto warning strips on the shoulder), repeated stopping and acceleration (detected via accelerometer) in combination with road type (detected via GPS location) and/or driver physiological conditions such as heart rate and pulse (detected via heart rate and EDA sensors) can be used to determine tailgating. See examples below.

The real-time data will be used to assess the driver's actions and to determine whether dangerous conditions exist, issue an alert to the driver, etc. See below. The data may be analyzed with respect to predetermined threshold values, e.g., more than a predetermined number of abrupt stops, rapid acceleration, occurrences of speeding, occurrences of veering, etc. It may also be advantageous to take into account the characteristics of the driver. For instance, each person drives differently, and what might be considered unusual behavior for one driver might be normal for another.

Thus, optionally, in step 104 the real-time data (collected in step 102) is used to learn the driver's characteristics. For instance, the data may be used to determine what the driver's normal habits are and to detect any activity that falls outside of that norm. To use a simple example, suppose a driver A routinely (e.g., more than 90% of the time) travels on the highway at a speed of from 50-55 miles per hour. If the driver is on the highway and going at a speed much less or greatly in excess of that range, then it might indicate a hazardous condition. Driver B, on the other hand, routinely (e.g., more than 90% of the time) travels on the highway at a speed of from 45-50 miles per hour. Thus, a different standard can be used for the drivers to determine their driving conditions. If a common standard was used (e.g., drivers in the United States tend to travel between 45-53 miles per hour on highways) then the opportunity to generate an alert might be missed (for instance, based on his/her history driver might be speeding at 55 miles per hour, but not so based on the national average) or unnecessarily (for instance, based on his/her history it is not unusual for driver A to be going at 55 miles per hour, however that is above the national average).

A determination is then made as to whether the real-time data indicates a hazardous driving condition. See step 106. As described above, this can involve excessive speed, veering/weaving, sudden braking and acceleration, excessive noise, inclement weather conditions, etc. As provided above, this determination can be based on a predetermined threshold, e.g., driving above a certain speed, repeated veering or weaving more than a certain number of times, etc. Of course, these standards can vary depending on the situation. For instance, as provided above, speeds acceptable on one road may be excessive on another. The data collected might be analyzed based on a set standard (such as national average of drivers—see above) or, preferably, based on characteristics learned from historical data collected from the driver (i.e., data collected over a given period of time—e.g., a week or longer such as monthly or even yearly).

If it is determined in step 106 that (YES) the driver is exhibiting normal driving practices (e.g., reasonable speed, no rapid accelerations, sudden decelerations, etc.), then as shown in FIG. 1, the process continues to collect data from the driver in real-time to monitor driving conditions. As provided above, that data can also be collected/analyzed to establish the driver's characteristics.

On the other hand, if it is determined in step 106 that (NO) the driver is exhibiting unusual driving behavior (with respect to a general standard or, preferably, based on the driver's learned characteristics—see above), then in step 108 feedback is provided to the driver. According to an exemplary embodiment, the feedback is provided to the driver via a message sent through the driver's wearable mobile device (e.g., smartwatch) and/or through another communication means, such as through the vehicle's radio. For example, many vehicles today are Bluetooth enabled, and communications via a user's mobile device can be routed through the vehicle's radio and/or other hands-free system.

Further, in order to provide useful feedback to the driver, the message preferably contains information about the potentially hazardous driving conditions. To use a simple example, if the real-time data suggests that the driver is speeding, then the message might tell the driver to "slow down." If the data suggests that the driver is weaving, the message might tell the driver to "pay attention to the road"

and/or that "road conditions may be slippery." The message is in an audible form so that the driver doesn't have to take his/her eyes off of the road. The feedback message provided to the driver can be selected based on a variety of predetermined scenarios, e.g., via a look-up table format. For example, if the potentially hazardous conditions involve excess speeds, then the message might be to "slow down," if the potentially hazardous conditions involve aggressive driving (e.g., rapid acceleration, abrupt stops, sudden veering, etc.), then the message might be to "calm down," etc. It is anticipated that multiple feedback messages might be provided at the same time if multiple different potentially hazardous conditions, e.g., "slow down" and then "slippery road conditions possible." While messages containing specific feedback for the conditions has advantages, the scenario is also anticipated herein where a more general message is provided to the driver, such as "hazardous conditions possible."

As shown in FIG. 1, the process is performed in an iterative manner while data is collected from the driver in real-time. Thus, if the unusual driving behavior continues and/or other hazards arise, this will be picked up in the data and subsequent feedback can be provided to the driver.

Optionally, in step 110, logs may be kept of the potentially hazardous conditions/feedback provided. This information can be reviewed by the driver to better assess his/her driving and/or to alert others as to his/her driving history. For instance, parents might want to know how their children are driving when they are not with them. Also, as provided above, insurance companies might track customer's driving histories with an incentive being that the customer's insurance rates will go down if they meet a certain driving safety standard.

Figure 2:
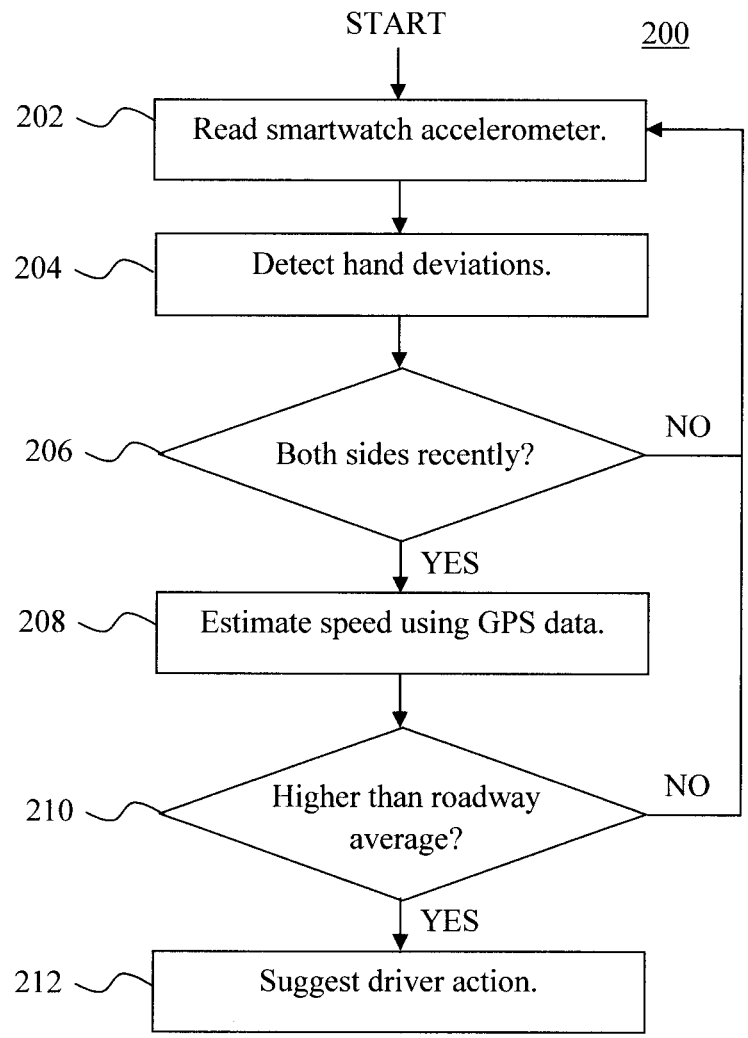
FIG. 2 is a diagram illustrating an exemplary implementation of the present techniques in a scenario where the potentially hazardous driving conditions include weaving according to an embodiment of the present invention.

The present techniques are further illustrated by the following non-limiting exemplary embodiments. In a first exemplary embodiment, the present techniques are implemented in the case where the driver is weaving and a determination is made based on fusion of the data from the sensors in the driver's smartwatch. See FIG. 2. Weaving may occur, for example, when a driver is in a hurry and is moving (left and right) to get around other vehicles on the road.

As provided above, the real-time data is collected from the driver's wearable mobile device (e.g., smartwatch) and analyzed in a continuous/iterative manner. In the present example, the real-time data read in step 202 from the accelerometer sensor indicates in step 204 that the driver is making lateral motions with his/her hands (hand deviations). The next determination to be made is whether or not those lateral motions are indicative of weaving, or just normal driving behavior. Namely, steering the vehicle generally involves lateral motions of the driver's hands to move the steering wheel. However, under normal driving conditions, the lateral side to side motions of the driver's hands are not generally rapid. Although, when weaving the driving will tend to turn the steering wheel one way, then rapidly back the other way, and so on.

Thus, in step 206, a determination is made as to whether the driving behavior involves rapid side to side movement of the driver's hand. To use a simple, non-limiting example, if the driver moves his/her hand to one side and then back the other way in less than or equal to 10 seconds, then that might indicate weaving. If it is determined in step 206 that (NO) the driver is not making rapid side-to-side hand movements, then the process continues to monitor the driver data in real-time (see above). On the other hand, if it is determined in step 206 that (YES), the drivers hand movements indicate a possibility of weaving, then the real-time GPS sensor data is used in step 208 to estimate the driver's speed.

If it is determined in step 210 that (NO) the driver is not speeding, then it may be assumed that the side-to-side hand movements have a cause other than weaving (for example, it might be a winding road, there might be construction obstacles, etc.), and the process continues to monitor the driver data in real-time (see above). It is notable that this is merely an example, and it is possible (via the present techniques) to alert the driver when rapid side-to-side hand movements occur at any speed as that alone may be indicative of weaving or other hazardous condition.

If it is determined in step 210 that (YES) the driver is speeding, then it may be inferred that the driver is in a hurry to get around other vehicles on the road and weaving, and in step 212 a suggested action (feedback) is provided to the driver, such as "relax" or "slow down." As provided above, this feedback can be provided in a non-distracting manner via an audio message from the driver's smartwatch and/or through the vehicle's audio system.

Figure 3:
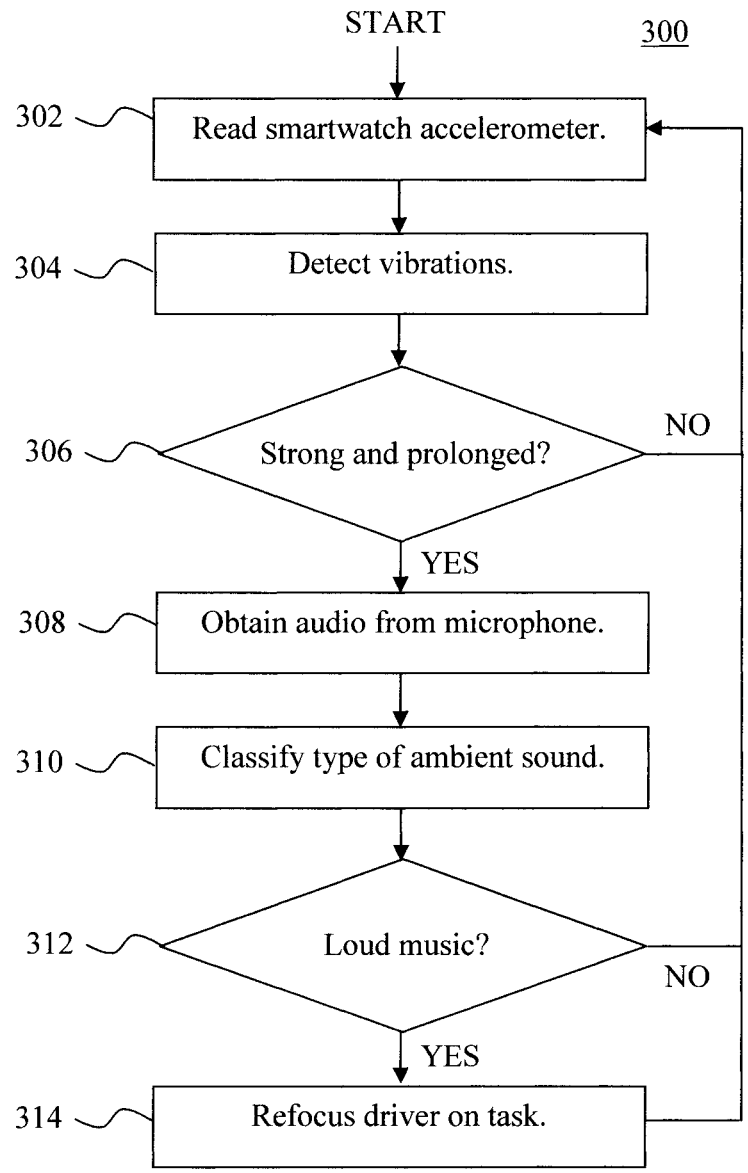
FIG. 3 is a diagram illustrating an exemplary implementation of the present techniques in a scenario where the potentially hazardous driving conditions include distracted driving according to an embodiment of the present invention.

In a second exemplary embodiment, the present techniques are implemented in the case where the driver is distracted and a determination is made based on fusion of the data from the sensors in the driver's smartwatch. See FIG. 3. As provided above, distractions can come from noise within the vehicle. In this example, the distraction is from music playing on the vehicle's radio which causes the driver to veer onto the shoulder of the road. Oftentimes, roadways have warning strips (called "rumble" strips) on the shoulder that, when driven on, cause vibrations throughout the vehicle that can be heard/felt by the driver. This alerts the driver that he/she has crossed to the shoulder and should move back onto the road.

As provided above, the real-time data is collected from the driver's wearable mobile device (e.g., smartwatch) and analyzed in a continuous/iterative manner. In the present example, the real-time data read in step 302 from the accelerometer sensor indicates in step 304 that there are vibrations within the vehicle. The next determination to be made is whether or not those vibrations are indicative of driving on warning/rumble strips, or just normal road vibrations. For instance, vibrations can occur on any roadway under normal driving conditions. However, the vibrations from normal driving are typically not strong and prolonged. When driving on warning/rumble strips, however, the strips are evenly spaced and generate intense vibrations throughout the vehicle.

Thus, in step 306, a determination is made as to whether the vibrations are strong and prolonged, i.e., are above a given frequency and duration. To use a simple, non-limiting example, if constant vibrations are detected at or above about 10 hertz (Hz) for a duration of greater than or equal to about 4 seconds, then that might indicate driving on warning/rumble strips. If it is determined in step 306 that (NO) the vibrations are not strong/prolonged, then the process continues to monitor the driver data in real-time (see above). On the other hand, if it is determined in step 306 that (YES), the vibrations are strong and prolonged and thus could be indicative of the vehicle driving on warning/rumble strips, then the real-time audio data from the driver's wearable mobile device (e.g., smartwatch) is obtained in step 308 and used in step 310 to classify the type of ambient sounds in the vehicle. Namely, since the scenario being examined here is avoiding distracted driving, then one may want to determine whether the driving conditions (in this case strong and prolonged vibrations presumed to be from driving on warning/rumble strips on the side of the road) are in fact caused by a distracted driver. It is notable however that alerts can be generated (via the present techniques) whenever strong and prolonged vibrations are detected regardless of any signs of distraction.

For example, high ambient noise (e.g., ambient noise in the vehicle is above a certain given decibel level) in the vehicle can be classified as loud music playing through the vehicle's audio system. Based on this classification, in step 312 a determination can be made as to whether the ambient noise in the vehicle is loud music. If it is determined in step 312 that (NO) the ambient noise in the vehicle is not loud (and distracting) music, then it may be assumed for example that the driver has purposely driven on the side of the road such as when avoiding an obstacle or due to road construction, etc. The process then continues to monitor the driver data in real-time (see above).

On the other hand, if it is determined in step 312 that (YES) there is loud music playing in the vehicle, then it may be inferred that the driver is distracted and as a result has veered off of the road, and in step 314 a suggested action (feedback) is provided to the driver to refocus the driver on the task of driving, such as "pay attention" and/or "turn down the music." As provided above, this feedback can be provided in a non-distracting manner via an audio message from the driver's smartwatch and/or through the vehicle's audio system.

Figure 4:
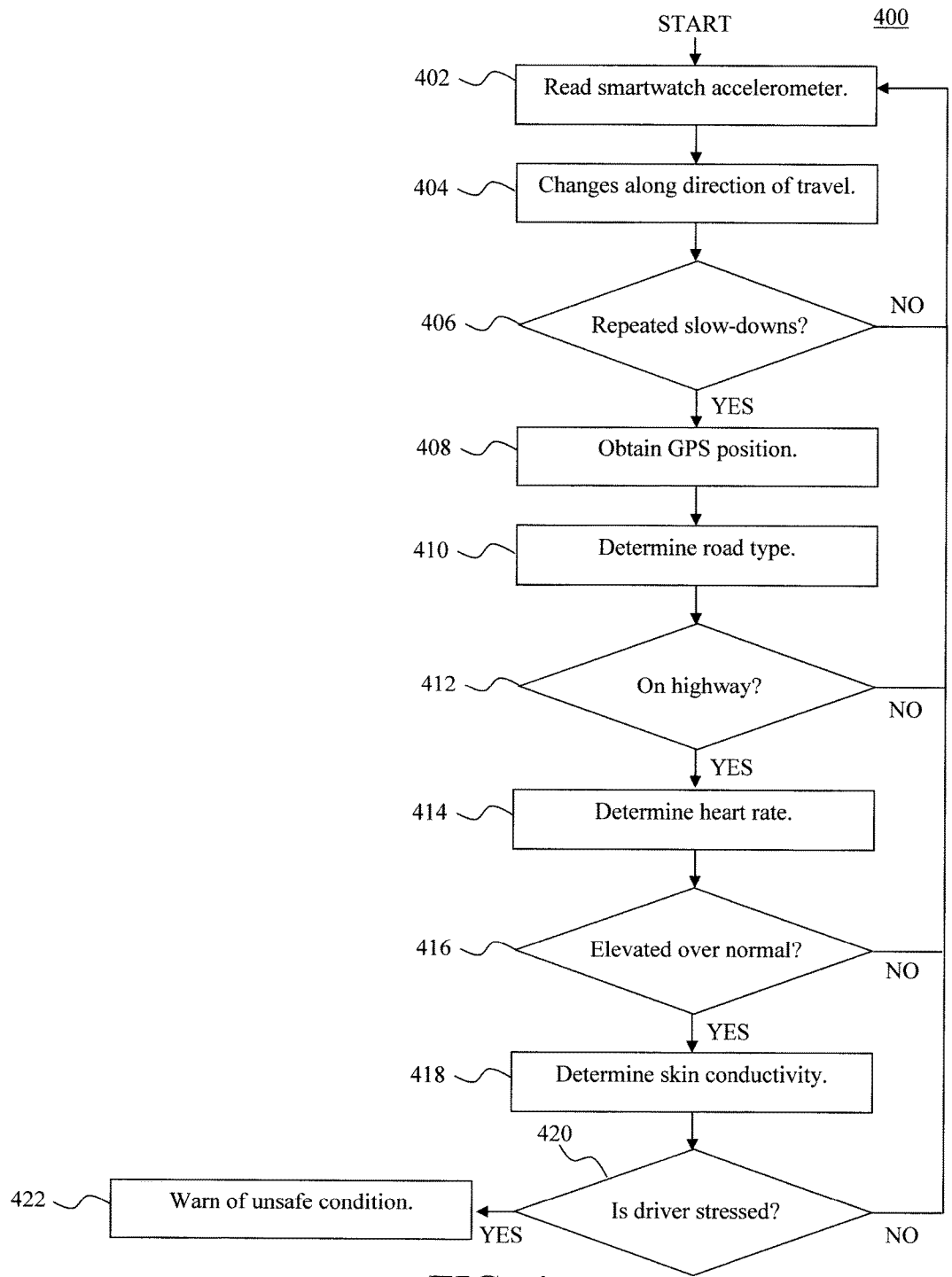
FIG. 4 is a diagram illustrating an exemplary implementation of the present techniques in a scenario where the potentially hazardous driving conditions include tailgating according to an embodiment of the present invention.

In a third exemplary embodiment, the present techniques are implemented in the case where the driver is tailgating and a determination is made based on fusion of the data from the sensors in the driver's smartwatch. See FIG. 4. Tailgating occurs when the driver is following too close behind another vehicle which can be hazardous. Tailgating can happen when the driver is in a hurry and can be detected based on rapid acceleration and sudden braking as the driver closely follows the vehicle in front of them.

As provided above, the real-time data is collected from the driver's wearable mobile device (e.g., smartwatch) and analyzed in a continuous/iterative manner. In the present example, the real-time data read in step 402 from the accelerometer sensor indicates in step 404 that the driver is making changes along the direction of travel. For instance, stepping on the brakes or accelerating makes changes in the vehicle's progression along the direction of travel. The question is whether these changes occur repeatedly which can be indicative of the driver following too closely behind another vehicle. For instance, a relatively constant speed can be maintained when following at a safe distance. However, when travelling too close to another vehicle, oftentimes constant braking followed by acceleration occurs. Of course, accelerations/decelerations occur during normal driving. Thus, to use a simple example, a threshold number of changes (along the direction of travel) over a certain time period can be set (e.g., more than 2 changes in a 2 minute period) to determine whether there is a possible tailgating scenario.

Thus, in step 406, a determination is made as to whether the driver is making an excessive number of changes in direction of travel (e.g., greater than the predetermined threshold number of changes in a given duration). If it is determined in step 406 that (NO) the changes along the direction of travel are not excessive (e.g., they are consistent with normal driving conditions), then the process continues to monitor the driver data in real-time (see above). On the other hand, if it is determined in step 406 that (YES), the changes along the direction of travel are excessive and thus could be indicative of a tailgating situation, then GPS data regarding the vehicle/drivers location is obtained in step 408, e.g., from the driver's smartwatch, and used in step 410 to determine the type of road the driver is on. GPS systems are commonly equipped with road map capabilities which can be referenced to determine what type of road (e.g., highway, small road, etc.) the driver is on. One reason for making a determination of road type is that a highway has different driving conditions from a small local road for instance. A small local road may have intersections and traffic lights that cause the driver to constantly stop and start, whereas relatively constant speeds are expected on a highway. Thus, a driver travelling through town might not be in fact tailgating when he/she has to brake and accelerate on a regular basis. Thus having information about the road type can be useful in assessing the driving conditions. It is notable however that alerts can be generated (via the present techniques) whenever excessive changes along the direction of travel occur.

Based on the road type determination, in step 412 a determination can be made as to whether the driver is currently on a highway. If it is determined in step 412 that (NO) the driver is not presently on a highway, then it may be assumed for example that the driver has to repeatedly make changes along the direction of travel, for example, in response to traffic signals, intersections, etc. The process then continues to monitor the driver data in real-time (see above).

On the other hand, if it is determined in step 412 that (YES) the vehicle is presently on a highway, then it may be inferred that the excessive changes along the direction of travel might be due to the driver tailgating another vehicle. Additionally, it may be useful to obtain physiological characteristics of the driver to make determination of aggressive driving. For instance, when driving aggressively a driver might have an elevated heart rate, anxiousness, etc. By further gauging the driver's physiological conditions, one can filter out scenarios where, e.g., the driver is on a highway and simply stuck in stop and go traffic which causes the driver to repeatedly make changes along the direction of travel.

Thus, according to an exemplary embodiment, in step 414 the driver's heart rate is determined (based on data obtained, e.g., from the driver's smartwatch), and a determination is made in step 416 as to whether the driver's heart rate is elevated. As provided above, the heart rate data can be evaluated based on past data collected from the driver and/or based on standard heart rate data.

If it is determined in step 416 that (NO) the driver does not have an elevated heart rate, then it may be assumed, for example, that the driver is simply stuck in stop and go traffic on a highway, and the process continues to monitor the driver data in real-time. On the other hand, if it is determined in step 416 that (YES) the driver has an elevated heart rate, then it may be assumed that the driver is in an excited state, potentially leading to aggressive driving behaviors such as tailgating. In that case, it may be useful to use further physiological data from the driver to confirm the situation. Again, this is merely an example, and any of the above-described indicators of aggressive driving may alone suffice to trigger an alert. By way of example only, the EDA data obtained, e.g., from the driver's smartwatch, can be used in step 418 to determine the driver's skin conductivity. As indicated above, as an individual becomes more stressed their skin conductivity changes (due to sweat gland activity). Based on the driver's skin conductivity data, in step 420 a determination is made as to whether the driver is stressed. For instance, typical baseline EDA SCR readings for an individual without stress are from about 10 uS to about 50 uS. Thus, any readings in excess of the baseline might indicate stress.

If it is determined in step 420 that (NO) the driver does not appear stressed, then the process continues to monitor the driver data in real-time. On the other hand, if it is determined in step 420 that (YES) the driver appears stressed, then in step 422 a suggested action (feedback) is provided to the driver to warn the driver of the unsafe condition, such as "relax" and/or "stop following so closely." As provided above, this feedback can be provided in a non-distracting manner via an audio message from the driver's smartwatch and/or through the vehicle's audio system.

Figure 5:
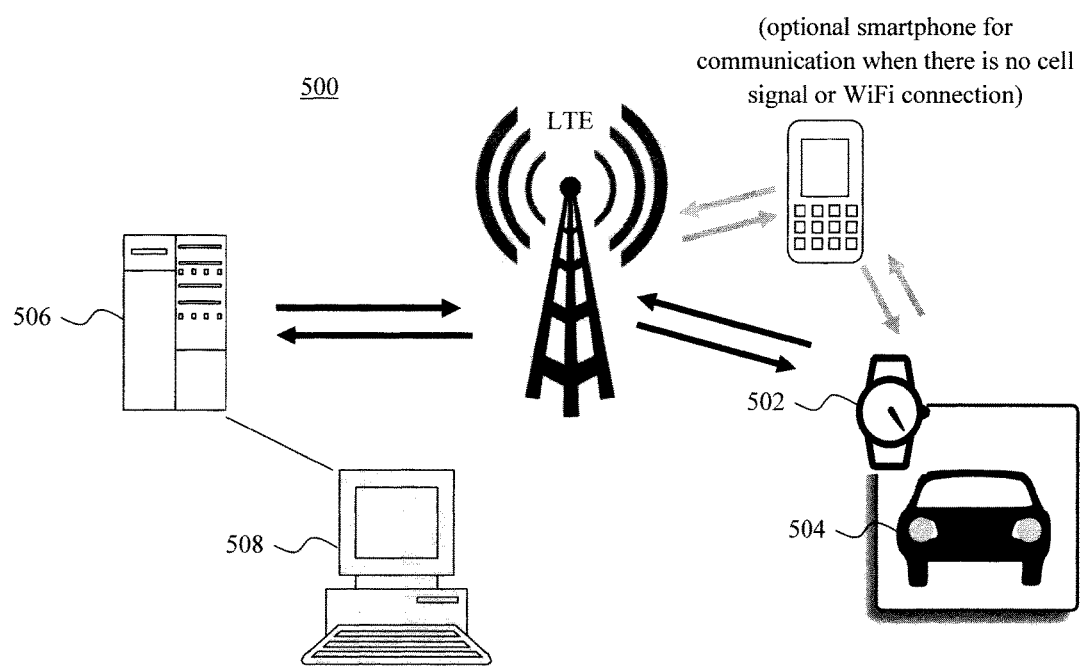
FIG. 5 is a diagram illustrating an exemplary system for alerting drivers of potentially hazardous driving conditions according to an embodiment of the present invention.

FIG. 5 illustrates an exemplary system 500 in which the present techniques can be implemented. As shown in FIG. 5, the driver's wearable mobile device (e.g., smartwatch 502)—worn while driving a vehicle 504—collects real-time data from the driver as described above. According to one exemplary embodiment, the driver's smartwatch 502 is configured to take the data it collects, analyze it and, if appropriate, generate an alert as described above. In that case, the smartwatch is configured to perform the steps of methodology 100 of FIG. 1, methodology 200 of FIG. 2, methodology 300 of FIG. 3, and/or methodology 400 of FIG. 4. Alternatively, as shown in FIG. 5, the real-time data collected by the driver's smartwatch 502 can be transmitted (in real-time) wirelessly to a central processing apparatus, such as server 506. Server 506 may be configured to receive data from multiple drivers via their respective smartwatches. Smartwatches without a cell signal or WiFi connection would transmit via an associated smartphone (see FIG. 5) using short-range (100 m) communication such as Bluetooth Low Energy (BLE).

Server 506 may be located at a central processing facility. By way of example only, as provided above, the present techniques can be implemented to provide feedback to insurance companies about the driving safety of its customers. In that case, the server 506 may belong to the insurance company.

The real-time data collected via the driver's smartwatch can be collected by the server 506, analyzed in the manner described above and, if appropriate an alert can be sent to the driver in real-time. In that scenario, server 506 is configured to perform the steps of methodology 100 of FIG. 1, methodology 200 of FIG. 2, methodology 300 of FIG. 3, and/or methodology 400 of FIG. 4. An apparatus that can be configured to serve as server 506 is provided in FIG. 6, described below.

As described above, feedback may also be provided to the driver and/or other third parties (e.g., the parents of a driver) about his/her driving record. That way, the driver can know what to improve on and/or what steps to take to drive more safely based on past experiences. Thus, as shown in FIG. 5, historical driving data can (optionally) be provided (e.g., by server 506) to one or more clients' personal computers 508.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Turning now to FIG. 6, a block diagram is shown of an apparatus 600 for implementing one or more of the methodologies presented herein. As described in conjunction with the description of FIG. 5 above, apparatus 600 may be configured to serve as server 506 in system 500. Thus, apparatus 600 can be configured to implement one or more of the steps of methodology 100 of FIG. 1, methodology 200 of FIG. 2, methodology 300 of FIG. 3, and/or methodology 400 of FIG. 4.

Apparatus 600 includes a computer system 610 and removable media 650. Computer system 610 includes a processor device 620, a network interface 625, a memory 630, a media interface 635 and an optional display 640. Network interface 625 allows computer system 610 to connect to a network, while media interface 635 allows computer system 610 to interact with media, such as a hard drive or removable media 650.

Processor device 620 can be configured to implement the methods, steps, and functions disclosed herein. The memory 630 could be distributed or local and the processor device 620 could be distributed or singular. The memory 630 could be implemented as an electrical, magnetic or optical memory, or any combination of these or other types of storage devices. Moreover, the term "memory" should be construed broadly enough to encompass any information able to be read from, or written to, an address in the addressable space accessed by processor device 620. With this definition, information on a network, accessible through network interface 625, is still within memory 630 because the processor device 620 can retrieve the information from the network. It should be noted that each distributed processor that makes up processor device 620 generally contains its own addressable memory space. It should also be noted that some or all of computer system 610 can be incorporated into an application-specific or general-use integrated circuit.

Optional display 640 is any type of display suitable for interacting with a human user of apparatus 600. Generally, display 640 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for alerting drivers of hazardous driving conditions, the method comprising the steps of:

collecting real-time data from a driver of a vehicle, wherein the data is collected via a mobile device worn by the driver;

determining whether the real-time data indicates that a hazardous driving condition exists;

providing feedback to the driver if the real-time data indicates that the hazardous driving condition exists; and continuing to collect data from the driver in real-time if the real-time data indicates that the hazardous driving condition does not exist, wherein the method further comprises the steps of:

detecting changes along a direction of travel using the real-time data;

determining whether a number of the changes along the direction of travel is greater than a given threshold number of changes for a given duration;

detecting a type of road on which the vehicle is travelling using the real-time data if the number of changes along the direction of travel is greater than the given threshold number of changes for the given duration;

continuing to collect data from the driver in real-time if the number of changes along the direction of travel is not greater than the given threshold number of changes for the given duration;

determining whether the vehicle is travelling on a highway;

detecting a heart rate of the driver using the real-time data if the vehicle is travelling on the highway;

continuing to collect data from the driver in real-time if the vehicle is not travelling on the highway;

determining whether the heart rate of the driver is elevated;

providing the feedback to the driver if the heart rate of the driver is elevated; and continuing to collect data from the driver in real-time if the heart rate of the driver is not elevated.

2. The method of claim 1, further comprising the step of: using the real-time data to learn characteristics of the driver.

3. The method of claim 2, further comprising the step of: comparing the real-time data to the characteristics of the driver to determine whether the real-time data indicates that the hazardous driving condition exists.

4. The method of claim 1, wherein the feedback is provided to the driver via the mobile device worn by the driver.

5. The method of claim 1, wherein the feedback is provided as an audible alert message to the driver.

6. The method of claim 5, wherein the audible alert message is provided to the driver via the mobile device worn by the driver.

7. The method of claim 1, wherein the feedback is provided as an audible alert message to the driver via an audio system of the vehicle.

8. The method of claim 1, further comprising the step of: selecting the feedback provided to the driver based on a variety of predetermined scenarios.

9. The method of claim 8, wherein the variety of predetermined scenarios are selected via a look-up table format.

10. The method of claim 1, further comprising the step of: tracking feedback provided to the driver.

11. The method of claim 1, wherein the real-time data collected from the user comprises physiological data for the user selected from the group consisting of: skin electrical characteristics, blood oxygen levels, heart rate, pulse, and combinations thereof.

12. The method of claim 1, wherein the real-time data collected from the user comprises trajectory data for the user selected from the group consisting of: movement, speed, direction, orientation, location, and combinations thereof.

13. The method of claim 1, wherein the real-time data collected from the user comprises environmental data selected from the group consisting of: air pressure, temperature, wind velocity, and combinations thereof.

14. The method of claim 1, wherein the mobile device worn by the user comprises at least one contact sensor.

15. The method of claim 1, wherein the at least one contact sensor is selected from the group consisting of: an electrodermal activity (EDA) sensor, a pulse oximeter sensor, a heart rate sensor, and combinations thereof.

16. The method of claim 1, wherein the mobile device worn by the user comprises at least one sensor selected from the group consisting of: a gyroscope sensor, a global positioning system (GPS) sensor, and combinations thereof.

17. The method of claim 1, wherein the mobile device worn by the user comprises at least one sensor selected from the group consisting of: a barometer, an air temperature sensor, a wind speed sensor, and combinations thereof.

18. The method of claim 1, wherein the mobile device worn by the user comprises a smartwatch.

19. The method of claim 1, further comprising the steps of:
detecting a skin conductivity of the driver using the real-time data if the heart rate of the driver is elevated; and
continuing to collect data from the driver in real-time if the heart rate of the driver is not elevated.

20. The method of claim 1, further comprising the step of:
using data fusion of the real-time data collected from the driver to determine whether the real-time data indicates that the hazardous driving condition exists.

* * * * *